(12) United States Patent
Morein

(10) Patent No.: US 6,614,449 B1
(45) Date of Patent: *Sep. 2, 2003

(54) METHOD AND APPARATUS FOR VIDEO GRAPHICS ANTIALIASING USING A SINGLE SAMPLE FRAME BUFFER AND ASSOCIATED SAMPLE MEMORY

(75) Inventor: Stephen L. Morein, Cambridge, MA (US)

(73) Assignee: ATI International SRL, Christchurch (BB)

( * ) Notice: Subject to any disclaimer, the term of this patent is extended or adjusted under 35 U.S.C. 154(b) by 377 days.

This patent is subject to a terminal disclaimer.

(21) Appl. No.: 09/619,129

(22) Filed: Jul. 18, 2000

Related U.S. Application Data

(63) Continuation-in-part of application No. 09/141,797, filed on Aug. 28, 1998, now Pat. No. 6,188,394.
(51) Int. Cl.⁷ .................................................. G09G 5/00
(52) U.S. Cl. ........................ 345/611; 345/555; 345/565
(58) Field of Search ................................ 345/418, 419, 345/422, 428, 581, 536, 611, 555, 565, 563

(56) References Cited

U.S. PATENT DOCUMENTS

| | | | | |
|---|---|---|---|---|
| 5,659,407 A | * | 8/1997 | Andresen et al. ........... 358/530 |
| 5,717,663 A | * | 2/1998 | Fujita .......................... 369/32 |
| 6,215,497 B1 | * | 4/2001 | Leung ......................... 345/419 |
| 6,339,428 B1 | * | 1/2002 | Fowler et al. .............. 345/582 |
| 6,356,269 B1 | * | 3/2002 | Nakatsuka et al. ......... 345/505 |

* cited by examiner

Primary Examiner—Matthew C. Bella
Assistant Examiner—Mackly Monestime
(74) Attorney, Agent, or Firm—Vedder, Price, Kaufman & Kammholz

(57) ABSTRACT

A method and apparatus for antialiasing in a video graphics system is presented. This is accomplished by determining if a pixel sample set, which results from oversampling, can be reduced to a compressed sample set that includes a single color value and a single Z value that fully describes a corresponding pixel. When the pixel sample set can be reduced to the compressed sample set, the compressed sample set is stored in a frame buffer at a location corresponding to the particular pixel that the sample set describes. When the pixel sample set cannot be reduced to a compressed sample set, pointer information is stored at the frame buffer location corresponding to the particular pixel. The pointer information includes a pointer that points to a selected address in a sample memory at which the complete sample set for the pixel is stored. The pointer information may also include a front most Z value corresponding to the sample set such that some pixel fragments to be blended can be discarded without referencing the sample memory.

22 Claims, 6 Drawing Sheets

For each pixel:

METHOD AND APPARATUS FOR VIDEO GRAPHICS ANTIALIASING USING A SINGLE SAMPLE FRAME BUFFER AND ASSOCIATED SAMPLE MEMORY

RELATED APPLICATIONS

The present application is a continuation-in-part of pending U.S. Pat. application Ser. No. 09/141,797, which was filed on Aug. 28, 1998 now U.S. Pat No. 6,188,394 and is assigned to the same assignee as the present application.

FIELD OF THE INVENTION

The invention relates generally to video graphics processing and more particularly to a method and apparatus for video graphics antialiasing that uses sample set compression.

BACKGROUND OF THE INVENTION

Computers are used in many applications. As computing systems continue to evolve, the graphical display requirements of the systems become more demanding. This is especially true in applications where detailed graphical displays must be updated quickly. In many applications that utilize such detailed graphical displays, maintaining the detail of the display can consume large amounts of memory storage space and processor bandwidth.

Computer displays and other high resolution display devices such as high definition televisions (HDTV), projectors, printers, plotters, and the like, present an image to a viewer as an array of individual picture elements, or pixels. The individual pixels are each given a specific color, which corresponds to the color of the image at the location of the particular pixel. The pixels are closely spaced, and the viewer's visual system performs a filtering of the individual pixel colors to form a composite image. If the partitioning of the image into individual pixel elements is performed properly, and the pixels are close enough together, the viewer perceives the displayed array of pixels as a virtually continuous image. Despite the viewer's visual filtering, the viewer remains sensitive to aberrations in the image, and video graphic systems must be designed to minimize these aberrations.

In many systems, graphical images for display are sampled, and the image is regenerated based on the stored samples. When the conservation of the detail is important, oversampling is typically utilized in order to avoid aliasing in the reconstructed graphical image. Oversampling techniques are well known in the art. In an oversampling system, multiple samples of each screen element, or pixel, are stored. Although each pixel is rendered using only a single color value, each of the samples for that particular pixel are used in generating the final color. In effect, a much more detailed, or higher-resolution, version of the image is stored within the computer, and this version is used to generate each of the colors for the pixels displayed on the screen.

Conventional oversampling systems in video graphics systems can require large amounts of memory. For example, if a system stores 8 samples for each particular pixel in memory and each sample includes 32 bits of color information and a 32-bit depth, or "Z", value, the memory requirements for a high-quality image which is 640×480 pixels is nearly 20 million bytes. The disadvantages of this amount of memory usage are apparent. First, the memory for such storage must be provided, which is costly. Second, the memory accesses required to store and retrieve the data can consume large amounts of bandwidth within the computing system.

Consequently, a need exists for an antialiasing technique that makes more efficient use of memory resources.

DETAILED DESCRIPTION OF A PREFERRED EMBODIMENT OF THE INVENTION

Generally, the present invention provides a method and apparatus for antialiasing in a video graphics system. This is accomplished by determining if a pixel sample set, which results from oversampling, can be reduced to a compressed sample set that includes a single color value and a single Z value that fully describes a corresponding pixel. When the pixel sample set can be reduced to the compressed sample set, the compressed sample set is stored in a frame buffer at a location corresponding to the particular pixel that the sample set describes. When the pixel sample set cannot be reduced to a compressed sample set, pointer information is stored at the frame buffer location corresponding to the particular pixel. The pointer information includes a pointer that points to a selected address in a sample memory at which the complete sample set for the pixel is stored. The pointer information may also include a front most Z value corresponding to the sample set such that some pixel fragments to be blended can be discarded without referencing the sample memory. By compressing pixel sample sets when possible, a loss-less system, which uses fewer memory resources, is achieved.

In a video graphics system that employs oversampling, each pixel in the system is described by a number of samples. These samples are combined to produce a resultant color value for the pixel. In one embodiment of the present invention, the oversampling is performed such that each pixel is described by eight samples. In other embodiments, other numbers of samples can be used. As is apparent to one of ordinary skill in the art, there is a tradeoff between the accuracy achieved with additional samples and the costs of processing and storing those additional samples.

Each sample includes a color value and a Z value. The Z value of a sample determines where the sample is positioned depth-wise in relation to other samples. This allows for one shape or image to be spatially positioned in front of another. In one embodiment of the present invention each sample is encoded using 64 bits. In such an embodiment, 31 bits of Z information are maintained for each sample, and 32 bits of color information is maintained for each sample. In other embodiments, numbers of bits may be used to store the color and Z data and some bits may be allocated to storing alpha values or stencil values. The complete set of samples that describes a pixel is referred to as a pixel sample set.

Figure 1:
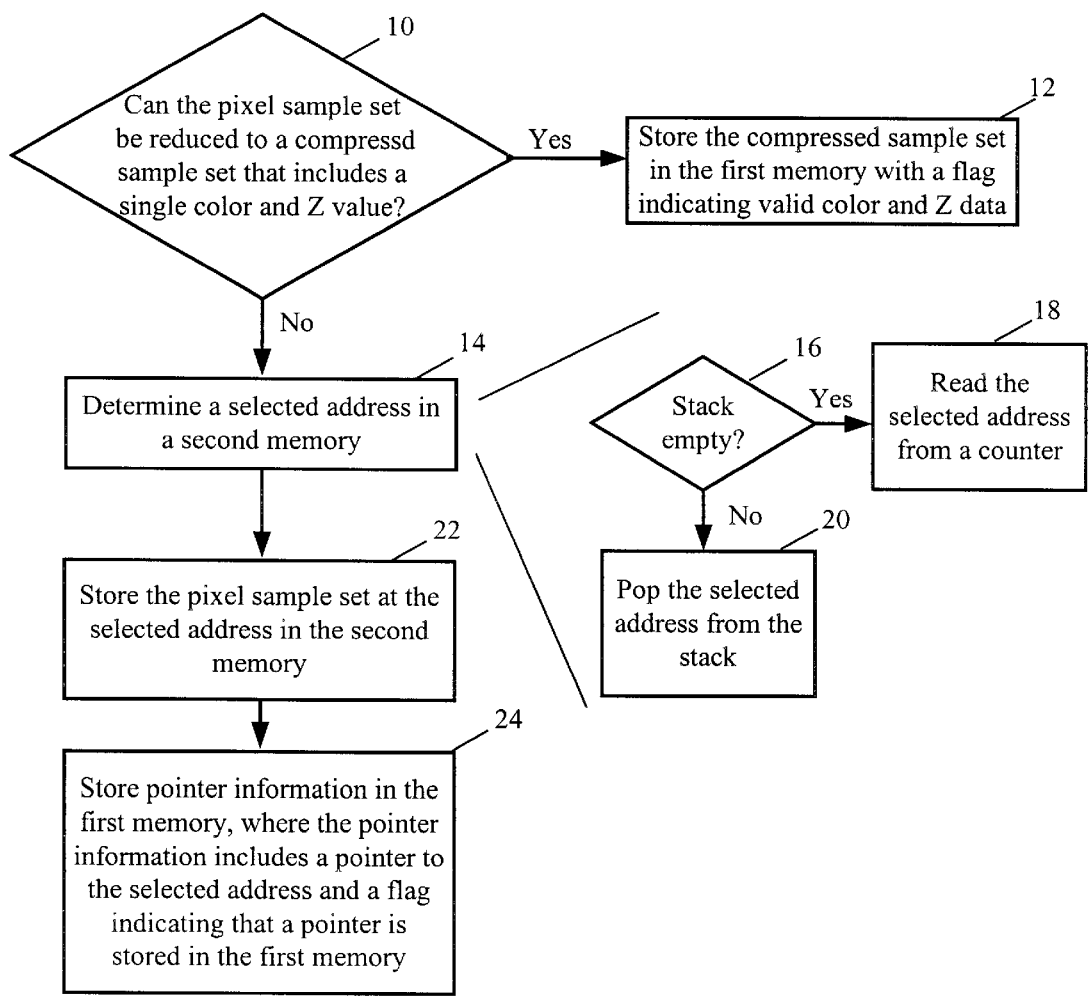
FIG. 1 illustrates a flow diagram of a method for storing antialiasing pixel data in accordance with a particular embodiment of the present invention.

The present invention can be better understood with reference to FIGS. 1–7. FIG. 1 illustrates a flow chart of a method for storing antialiasing pixel data. At step 10, it is determined whether or not a pixel sample set can be reduced to a compressed sample set. A compressed sample set includes a single color value and a single Z value. In order for the sample set to be capable of being reduced to such a compressed sample set, the color and Z values for each of the samples should be substantially similar. A tolerable deviation may be factored into the reduction process such that if all of the Z values for the samples are within the tolerable deviation of an average value, the average value may be used as the Z value in the compressed sample set. A similar tolerable color deviation may also be used to reduce substantially similar colors to a single color value.

The method realizes that many sample sets can be described by a single color and a single Z value and that it is wasteful to store all of the samples when this is the case. Therefore, when it is possible, instead of storing all eight samples, each having a color and Z value, the method compresses the eight samples to one sample (a color and a Z value) and a flag that indicates whether or not such compression was possible for the pixel.

If it is determined at step 10 that the pixel sample set can be reduced to a compressed sample set, at step 12, the compressed sample set is stored in a primary memory at a memory location that corresponds to that particular pixel. The primary memory may be the frame buffer associated with the display frame. Preferably, the primary memory is arranged such that each pixel has an entry that includes one or more memory locations that may be used to store the compressed sample set.

Figure 2:
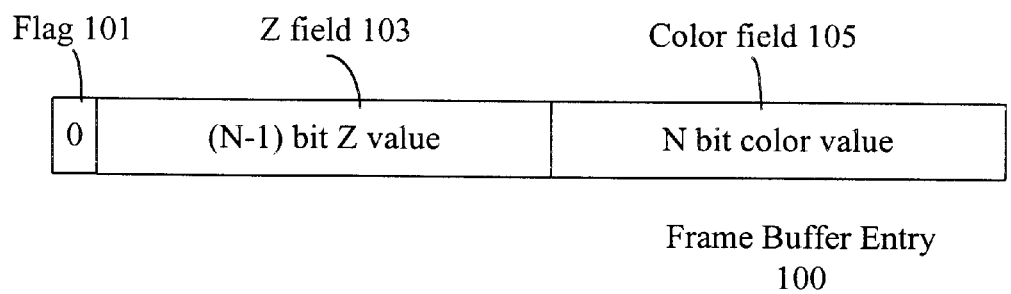
FIG. 2 provides a graphical representation of a first type of frame buffer entry in accordance with a particular embodiment of the present invention.

FIG. 2 illustrates an example frame buffer entry 100 that stores a compressed sample set. The compressed sample set includes a Z field 103 that stores the Z value for the compressed sample set. In the example illustrated, N–1 bits are allocated to storing the Z value. The color field 105 of the entry stores the color value for the compressed sample set. In the example shown, N bits are allocated to storing the color value, where in a particular embodiment, N is equal to 32. A single bit flag 101 may be used to distinguish between frame buffer entries that store compressed sample sets that include valid color and Z values for the pixel location and those entries that store pointer information. In the example shown, a "0" as the flag value indicates a compressed sample set is stored in the entry, whereas a "1" as the flag value indicates pointer information is stored in the entry. As is apparent to one of ordinary skill in the art, these bit values may be reversed such that a "1" indicates a compressed sample set and a "0" indicates pointer information.

Typically, the memory used to store the frame buffer is a fast access time memory that is of a limited size. As such, by reducing the storage for each pixel in the frame buffer to a single 64-bit entry, the size of the frame buffer can be reduced from that which would be required to store eight 64-bit samples for each of the pixel locations.

If it is determined at step 10 that the sample set cannot be reduced to a compressed sample set the method proceeds to step 14. At step 14, a selected address in a secondary memory, which may be referred to as a sample memory, is determined for storage of the complete sample set. Preferably, this secondary memory is larger than the frame buffer, or primary memory, such that it can store a plurality of such sample sets. The secondary memory, or sample memory, may include non-local memory, such as main memory that is accessed through a bus.

The address selection performed at step 14 may be performed as illustrated in steps 16, 18, and 20. At step 16, it is determined if a stack is empty, where the stack stores released memory locations in the secondary memory. A released memory location is created when a sample set that is stored in the secondary memory is altered such that it can be reduced to a compressed sample set. At that point, the compressed sample set is stored in the frame buffer, and the locations used by the sample set in the secondary memory are released and can be reused to store other samples. If the stack is determined to be non-empty at step 16, (i.e. it contains at least one released location), the method proceeds to step 20, and the selected address is determined by popping a released location from the stack.

If the stack is determined to be empty at step 16, the method proceeds to step 18. At step 18, the selected address is determined by reading a counter value. The counter monitors storage in the sample memory and increments as pixel data is stored in the sample memory. The counter contains the next free location in the memory. It should be apparent to one skilled in the art that the overall system may be implemented with the counter alone. Without the stack, released locations may either be reused through some other means, or they may be ignored and the system can reclaim them periodically through a reclamation or refresh routine.

Once the selected address has been determined at step 14, the method proceeds to step 22. At step 22, the pixel sample set is stored at the selected address in the sample memory. Preferably, the pixel sample set includes a number of color and Z value pairs equal to the number of samples per pixel that are generated via the oversampling scheme. Ordering of the samples as stored determines which color/Z pair describes each sample. In a system with 8 samples per pixel and 32-bit color and Z values, each sample set will require 64 bytes.

Figure 3:
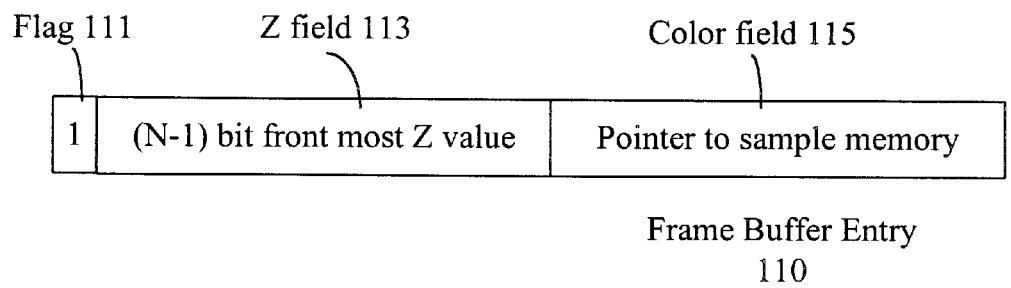
FIG. 3 provides a graphical representation of a second type of frame buffer entry in accordance with a particular embodiment of the present invention.

At step 24, pointer information is stored in the primary memory (frame buffer) at the location corresponding to the pixel that the sample set stored in the secondary memory describes. FIG. 3 illustrates an example frame buffer entry 110 that stores pointer information. The color field of the pointer information stores a pointer that points to the location in the sample memory where the complete sample set is stored. This pointer allows the system to access the samples when needed. The Flag 111 of the frame buffer entry 110 indicates that pointer information is stored in the entry, thus allowing other circuitry or software to realize that the color field 115 stores a pointer rather than color data. The Z field 113 may store the front most Z value for the sample set as stored in the sample memory. For example, if the sample set includes samples corresponding to two primitives, one partially overlapping the other, the front-most Z value stored in the Z field 113 indicates the Z value for the overlapping primitive.

Storage of the front most Z value for the sample set as part of the pointer information may allow for some video graphics processing without having to access the sample memory. For example, if a fragment is later merged with this pixel, and the fragment completely covers the pixel and has a closer Z value than that stored in the pointer information, it can be assumed that the fragment completely covers the samples in the sample memory. Alternatively, the rear-most Z value of the sample set may be stored in the frame buffer, and a fragment that has a Z value behind the rear-most value can be disregarded. In other embodiments, both the front-most Z value and the rear-most Z value for the sample set may be stored in the pointer information. In some cases, these values may have to be rounded or truncated in order to allow for storage within the space allotted. For example even though each Z value in the sample set may be stored using 32 bits, there may only be 31 bits available within the frame buffer entry 110. As such, the least significant bit (LSB) may not be represented within the frame buffer entry 110.

By storing compressed sample sets in a primary, local memory (i.e. the frame buffer) when possible, and when compression is not possible, storing the sample set in non-local memory with a pointer in local memory, the amount of total memory required to implement an oversampling system can be greatly reduced with no loss of information.

Figure 4:
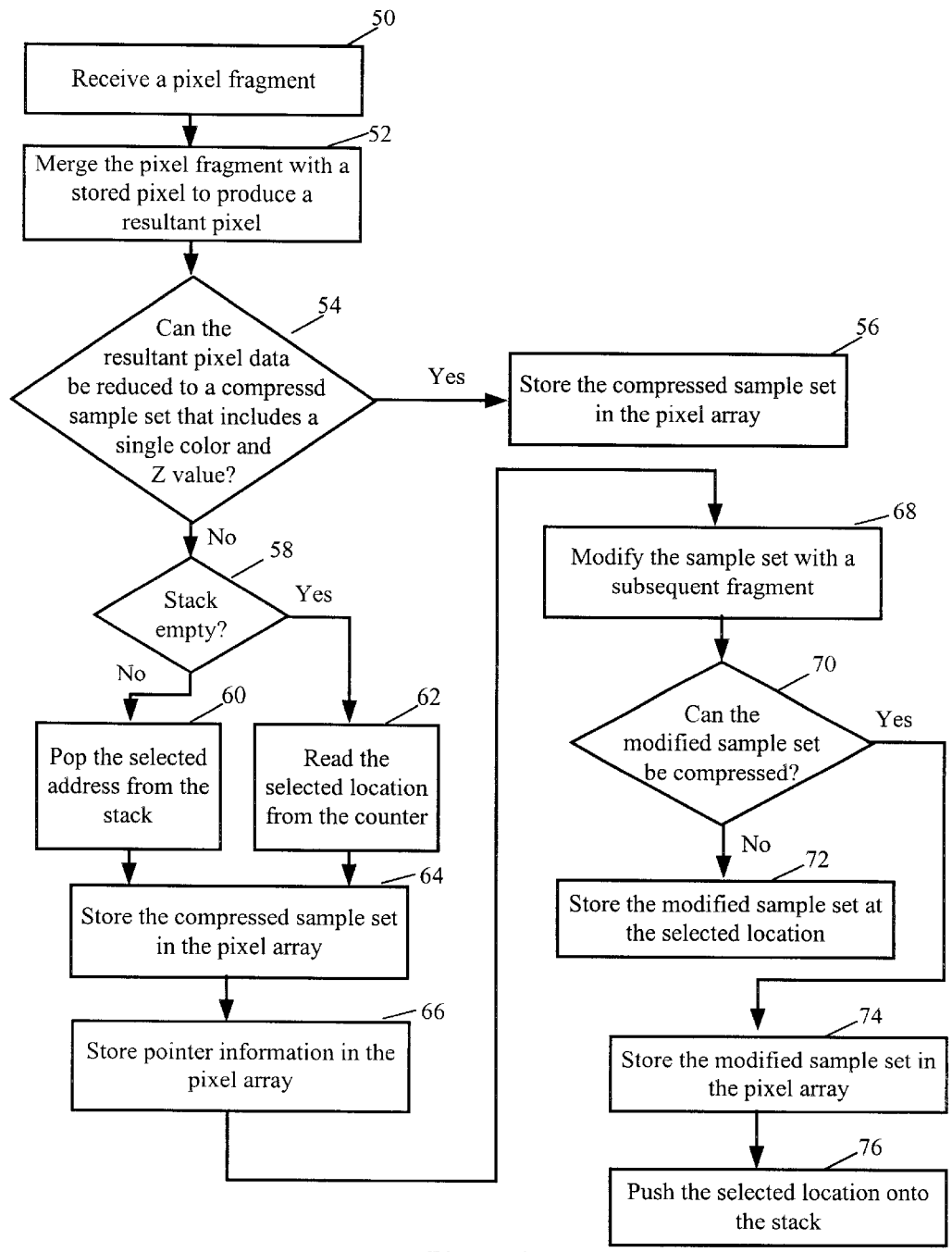
FIG. 4 illustrates a flow diagram of a method for storing oversampled pixel data in accordance with a particular embodiment of the present invention.

FIG. 4 illustrates a flow diagram corresponding to an antialiasing method that requires fewer memory resources than conventional oversampling schemes. At step 50, a pixel fragment is received that corresponds to a stored pixel in a pixel array. The pixel fragment is characterized by pixel fragment data that may modify the currently stored pixel data that characterizes the stored pixel. The fragment may include a color value, a Z value, and a coverage mask, where the coverage mask indicates to which of the samples for the pixel the color and Z values correspond. For example, in an 8-sample/pixel oversampling scheme, a mask of 00000001 might indicate that the color and Z values for the fragment should only be applied to the final sample (sample 7 if the samples are numbered 0–7). A fragment that has complete pixel coverage may be represented by 11111111.

At step 52, the pixel fragment is merged with the stored pixel to produce a resultant pixel characterized by resultant pixel data. Merging the pixel fragment may include retrieving samples from the sample memory or reading single color/Z pair from the frame buffer. The Z value for the fragment is compared with the stored pixel data to determine if the stored pixel data is modified, and if so, the fragment color and Z values may replace some of the color and Z values stored for the pixel. At step 54, it is determined whether or not the resultant pixel data can be compressed into a compressed sample set. This determination is similar to that described in to step 10 of FIG. 1.

If the resultant pixel data can be described using a compressed sample set, at step 56 the compressed sample set is stored in the pixel array within the frame buffer. As described above, the compressed sample set includes a single color value, a single Z value, and a flag that indicates that the color and Z values are valid data for the pixel and not a front-most Z value and a pointer to a group of samples. A descriptor in such an embodiment includes a color value and a Z value.

If the resultant pixel data cannot be adequately described with a compressed sample set, the complete sample set resulting from the combination of the fragment with the stored pixel data is stored in a selected location external to the pixel array in the frame buffer, and then a pointer to this location is stored in the pixel array. The sample set may be stored in system memory, or in another sample memory that may be slower than the memory that stores the pixel array. Determination of the selected location at which to store the complete sample set may include the use of a stack or a counter. At step 58, it is determined if a stack is empty or if it contains the selected location to which the sample set can be stored. The stack stores released locations as described above. If the stack is non-empty and contains the selected location, the location is popped from the stack at step 60. If the stack is empty does not does not contain the selected location, the selected location is read from a counter at step 62.

At step 64, the sample set is stored at the selected location. The sample set may be stored as a plurality of samples, where the number of samples is fixed for each pixel. Each sample includes a color value and a Z value. In another embodiment, the sample set may be stored as a linked list, where the pointer stored in the pixel array points to the first member of the linked list. In a linked list structure, each element of the list points to the next element in the list. This may allow for a flexible number of samples to be stored for each pixel rather than a fixed number.

At step 66, pointer information is stored in the pixel array. The pointer information preferably includes a pointer to the location in the sample memory at which the sample set is stored, a front most Z value corresponding to the sample set, and a flag that indicates that pointer information is stored in the pixel array. At this point, the resultant pixel data produced through the merger of the incoming fragment with the previously stored pixel data has been stored. In the case where the resultant pixel sample set could not be compressed, future modification to the stored pixel data may change this status.

At step 68, a subsequent fragment modifies the sample set in the same manner as in steps 50 and 52. At step 70, it is determined whether the modified sample set can now be compressed into a compressed sample set that includes a single color and a single Z value. If not, at step 72 the modified sample set is stored at the selected location. In other words, the modified sample set simply replaces the previously existing sample set that was stored for this particular pixel. No updates to the pixel array are required.

At step 74, if it is determined that the modified sample set can be stored as a subsequent compressed sample set, the subsequent compressed sample set is stored in the pixel array. The subsequent compressed sample set replaces the pointer information that was previously stored in the pixel array. When the pointer information is replaced, the selected location to which the pointer pointed is no longer in use, and this location is therefore free to be re-used. In order to facilitate re-use, at step 76 the selected location is pushed onto the stack. The next time that a location is required for storing an uncompressed sample set, this location can be popped from the stack and the selected location will be re-used. This reuse furthers the memory conservation aspects of the present invention.

Figure 5:
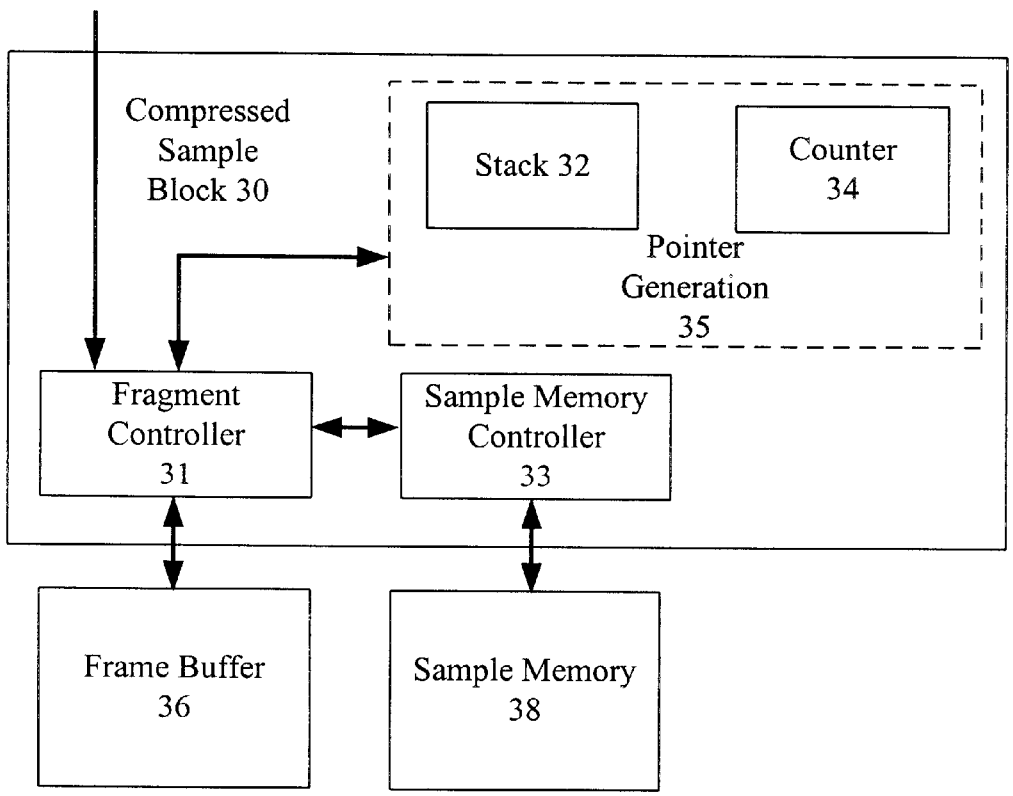
FIG. 5 illustrates a block diagram of an apparatus for display antialiasing in accordance with a particular embodiment of the present invention.

FIG. 5 illustrates an apparatus for display antialiasing. The apparatus includes a frame buffer 36, a sample memory 38, and compressed sample block 30. The compressed sample block 30 determines whether pixel data can be described, or summarized, with compressed sample sets. The compressed sample block 30 then controls the storage of the sample sets (compressed and uncompressed) in the frame buffer 36 and the sample memory 38. The sample memory 38 stores a plurality of pixel entries, and each of the pixel entries stores the plurality of pixel samples that result from oversampling a pixel of the display. The frame buffer 36 stores a pixel array, where each element of the pixel array describes a particular pixel of the display. The compressed sample block 30 may be the processor on a graphics card where the sample memory 38 is the main memory of the system that is accessed over an Accelerated Graphics Protocol (AGP) bus.

When the data, or samples, for a particular pixel can be reduced to a compressed sample set that includes a single color value and a single Z value, the compressed sample set is stored in the frame buffer 36 in the element corresponding to the pixel which the compressed pixel set describes. When the pixel data corresponding to the pixel cannot be reduced to a compressed sample set, the pixel data is stored at a pixel entry of the sample memory 38, and a pointer to the pixel entry is stored in the frame buffer 36. The pointer to the pixel entry is stored in the element of the pixel array corresponding to the pixel that is described by the samples stored in the sample memory 38. In some embodiments, the pointer may be stored along with a front-most Z value corresponding to the sample set stored in the sample memory. A flag is included in each element of the frame buffer that indicates whether pointer information or valid color and Z data is stored for each pixel in the frame buffer.

The sample memory 38 stores a multi-sample array, where each element of the multi-sample array stores a predetermined number of samples. In a system that employs eight times oversampling of each pixel, each element of the multi-sample array stores eight samples, where each sample includes a color value and a Z value. It should be apparent that the multi-sample array may store a subset of the complete sample set produced by oversampling. In other words, the system may choose to forfeit some of the detail and only store four of the eight samples. The sample memory 38 may be memory that is not as fast as the frame buffer 36. This may include non-local memory, such as the main memory of a processor external to the video graphics card upon which the present video graphics system is implemented. In such an embodiment, the main memory may be accessed over a bus structure such as an AGP bus.

Because the sample memory 38 is typically slower than the frame buffer 36 and more memory operations are required to store a multi-sample data set than compressed sample set, the system can be slowed if it is forced to wait for read and write operations to and from the sample memory 94. In order to offload some of these operations, a First In First Out (FIFO) buffer may be included in the sample memory controller 33. The FIFO buffers the stream of memory operations provided to the sample memory controller 33 from the fragment controller 31. This allows the fragment controller 31 to perform other functions in the system while these memory operations are performed.

The fragment controller 31 receives fragments 37 that it blends with stored pixel data to produce resultant pixel data that may require multiple samples or a single sample to describe. The fragment controller 31 interacts with the pointer generation block 35 that provides pointers to the next free location in the sample memory 38 that is to be used when a new entry in the sample memory 38 is created. The sample memory controller 33 is coupled to the fragment controller 31 and the sample memory 38 and controls the interaction with the sample memory 38. Such interaction can include retrieving samples from memory, storing new sample sets in the memory, or blending samples corresponding to a fragment with the samples stored for a corresponding pixel in the sample memory.

The pointer generation block 35 may include a counter 34 and a stack 32. The counter 34 indicates the next unused pixel entry of the sample memory 38, and after the next unused pixel entry is read by the fragment controller 31, the counter 34 increments to produce the next unused entry. If each entry includes 64 bytes of storage space, the counter 34 may maintain only the upper address bits such that the counter 34 steps in 64-byte increments with respect to the sample memory 38. In other words, the value read from the counter 34 may be padded with a fixed set of bits on the least-significant end to form the complete address of the next unused pixel entry.

The stack 32 stores released pixel entries. As was described with respect to FIGS. 1 and 4 above, when an incoming fragment modifies a pixel that is currently described using a number of pixels in the sample memory, it may be changed such that it the resulting samples can be compressed into a compressed sample set that includes a single color value and a single Z value. When this occurs, the compressed sample set for that pixel is stored in the frame buffer 36, and the pixel entry that was being used in the sample memory 38 to store the pixel data set is free to be used to store another pixel data set. When this happens, the released pixel entry is pushed onto the stack 32.

When the fragment controller 31 needs an unused entry in the sample memory 38, it first checks the stack 32. If there is released pixel entry on the stack 32, the fragment controller 31 pops the released pixel entry from the stack 32 for use as the unused entry. If the stack is empty, the fragment controller 31 reads the next unused entry from the counter 34.

The fragment and sample memory controllers 31 and 33 may perform the functions required to perform antialiasing blending and data processing operations based on software algorithms that cause processors included in these blocks to perform certain functions. Software algorithms that cause a processor or controller to perform the functions of the methods illustrated herein may be stored in any manner of computer readable medium, including, but not limited to, a diskette, magnetic tape, ROM, RAM, a hard disk, or a CD-ROM. Execution of the software by a processor causes the processor to operate in a specific and predetermined manner such that it performs the steps or functions required by the methods described above and with respect to FIGS. 6 and 7 below. In some embodiments, circuitry or hardware may perform some or all of the steps or functions, whereas other steps or functions are performed in software. In other embodiments, either or both of the controllers 31 and 33 may include a state machine that performs the functions required to interact with the frame buffer 36 and the sample memory 38.

Figure 6:
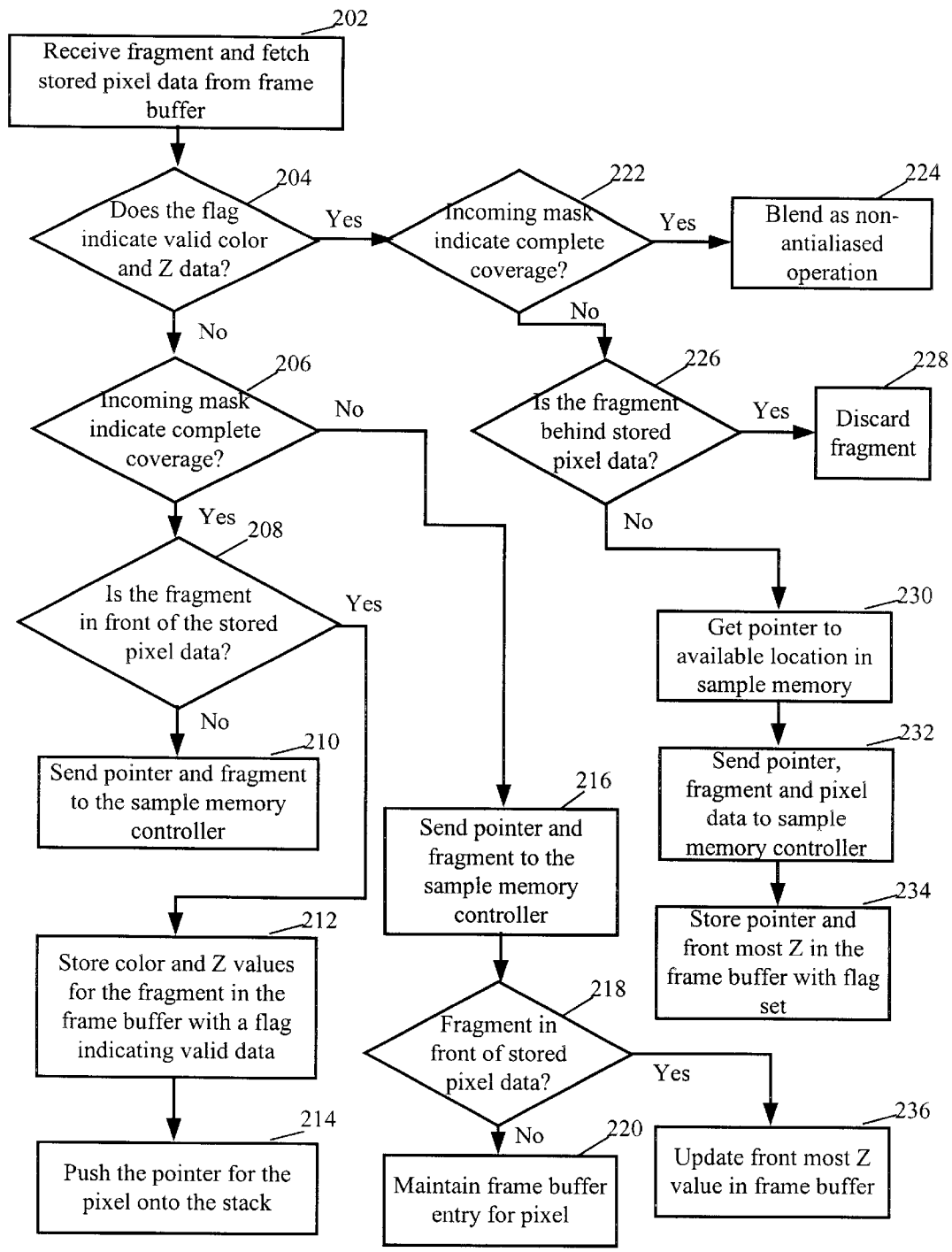
FIG. 6 illustrates a flow diagram of a method for processing an oversampled pixel fragment in accordance with a particular embodiment of the present invention.

FIG. 6 illustrates a flow diagram that includes functions that may be performed by the fragment controller 31 of FIG. 5. The functions are part of a method that processes fragments in a graphics system that utilizes oversampling antialiasing and stores either a single descriptor (color/Z pair) or pointer information for each pixel in the frame buffer. The method begins at step 202 where a fragment is received. The fragment includes a color, a Z value, and a coverage mask that indicates which samples for the pixel the fragment covers. The fragment also includes pixel coordinate information that indicates to which pixel of the display the fragment corresponds. Based on this coordinate data, the stored pixel data for that pixel location is retrieved from the frame buffer.

The stored pixel data for each pixel location includes a flag. The flag indicates whether the stored pixel data represents valid color and Z data or pointer information. At step 204, it is determined if the flag indicates that valid color and Z data have been retrieved from the frame buffer. If the flag indicates that valid color and Z data have not been fetched, and therefore pointer information has been retrieved, the method proceeds to step 206. In some embodiments, the color data and Z data portions of the stored pixel data may be stored in separate memory structures. In such embodiments, a flag may be included with the color data as it is stored as well as with the Z data as it is stored. As such, only one of the two memory structures would have to be accessed in order to determine whether or not valid color and Z data is present in the frame buffer.

At step 206, the mask included in the fragment data received is examined to determine if the fragment has complete pixel coverage. In other words, it is determined if the color and Z values for the fragment correspond to all of the samples for the pixel. In one embodiment, this may be indicated by the mask containing all 1's. If the fragment has complete coverage, the method proceeds to step 208.

At step 208, it is determined if the fragment is in front of the stored pixel information. This determination can be made if the front most Z value for the complete set of samples corresponding to the pixel location is stored with the stored pixel data in the frame buffer. This front most Z value can be compared with the Z value of the fragment, and if the fragment Z value is in front of the front most Z value, the fragment, which has complete coverage of the pixel, completely covers the stored pixel data and renders it moot. If such is the case, the method proceeds to step 212. At step 212, the color and Z values for the pixel fragment are stored in the frame buffer along with a flag that indicates the values in the pixel location represent color and Z data as opposed to pointer information.

If it is determined at step 208 that the fragment does not lie in front of the front most sample of the stored pixel data for the pixel, the method proceeds to step 210. At step 210, the pointer to the full set of samples stored for the pixel is sent to the sample memory controller along with the fragment. The sample memory controller can then blend the fragment with the stored samples in the sample memory on a sample-by-sample basis and store the results at the location corresponding to the pointer. The information in the frame buffer is not updated, as the samples for the pixel are still in the same location and the front most Z value has not been changed as a result of blending the fragment.

If it is determined at step 206 that the fragment being received does not have complete coverage, the method proceeds to step 216. At step 216 the pointer to the full set of samples stored for the pixel is sent to the sample memory controller along with the fragment. The sample memory controller can then blend the fragment with the stored samples in the sample memory on a sample-by-sample basis and store the results at the location corresponding to the pointer. The method then proceeds to step 218 at which it is determined whether or not the fragment is positioned in front of the stored pixel data. This can be determined by comparing the Z value for the fragment with the front most Z value for the full set of samples, which is stored in the frame buffer. If it is determined that the fragment does lie in front of the stored pixel information, the method proceeds to step 236 where the front most Z value stored in the frame buffer is updated to reflect the new front most Z value for the sample set stored in the sample memory. The new front most Z value is the Z value of the fragment. If it is determined at step 218 that the fragment is not in front of all of the stored samples for the pixel, the method proceeds to step 220. At step 220, the frame buffer entry is left unchanged as the front most Z value for the sample set is not modified as a result of blending the fragment with the stored set of samples.

Returning to step 204, if it is determined that the flag indicates that valid color and Z data are stored in the frame buffer for the pixel (the sample set for that pixel could be compressed to a single color and Z value pair), the method proceeds to step 222. At step 222, it is determined if the incoming mask included in the fragment indicates that the fragment completely covers the pixel. If so, the method proceeds to step 224 and the fragment and stored color/Z pair are blended as they would be in a non-antialiased system. In other words, the Z value stored in the frame buffer is compared with the Z value of the fragment. If the Z value of the fragment indicates it lies in front of the stored pixel data, the color and Z values for the fragment replace the color and Z values currently stored in the frame buffer. If the fragment lies behind the stored pixel data, the fragment is discarded.

If it is determined at step 222 that the fragment does not have complete pixel coverage, the method proceeds to step 226. At step 226, it is determined if the fragment is behind the stored pixel data. This is accomplished by comparing the Z value in the frame buffer with the Z value for the fragment. Because the Z value in the frame buffer represents the Z value for all of the samples for the pixel, if the fragment Z is behind the stored Z, the fragment is completely covered by the stored samples and therefore moot. As such, the fragment is discarded at step 228.

If it determined at step 226 that the fragment is not behind the stored pixel data, the method proceeds to step 230. If the fragment is not behind the stored pixel data, the resultant pixel data resulting from the blending of the fragment with the stored pixel data is going to include samples from both the fragment and samples corresponding to the current Z and color values stored. As such, the resultant data cannot be compressed to a single color/Z pair and the full set of samples will be stored in the sample memory.

At step 230, a pointer to the next available location in the sample memory is obtained. This may be done by popping the location off a stack or by retrieving the next available location from a counter. At step 232, the pointer, the fragment and the pixel data stored in the frame buffer are sent to the sample memory controller. The sample memory controller can then blend the fragment and the stored pixel data to produce a sample set that is stored at the location corresponding to the pointer. At step 234, the pointer and the front most Z value (either the fragment Z or the stored Z) is stored in the frame buffer along with a flag that indicates the presence of pointer information rather than a single color/Z pair.

Figure 7:
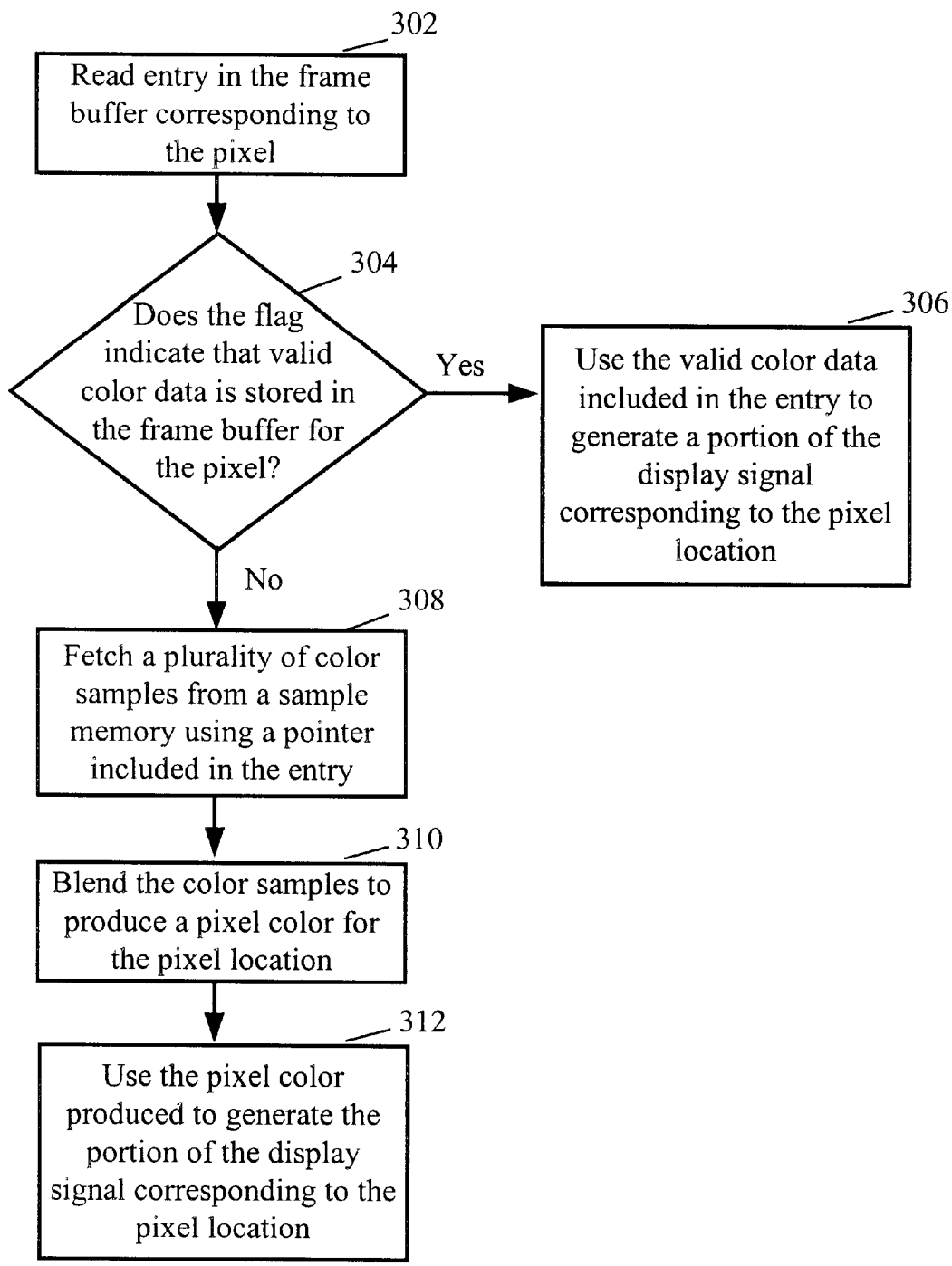
FIG. 7 illustrates a flow diagram of a method for generating a display signal in an antialiased video graphics system in accordance with a particular embodiment of the present invention.

Once an entire scene or frame has been rendered, a display signal is generated such that the image can be provided to a user on a display. FIG. 7 illustrates a flow diagram of a method for generating a display signal in a system the uses the antialiasing sample storage techniques described herein. The method is performed for each pixel location included in the display frame.

The method begins at step 302 where the entry in the frame buffer corresponding to the pixel location is read from the frame buffer. Each entry includes a flag, a Z field, and a color field such as those described with respect to FIGS. 2 and 3 above. At step 304, it is determined if the flag included in the entry indicates that the entry stores valid color data in the color field for the pixel location. If it is determined that the color field of the entry includes valid color data, the method proceeds to step 306. At step 306, the valid color data included in the entry is used to generate the portion of the display signal corresponding to the pixel location.

If it is determined at step 304 that the flag indicates the color field stores a pointer rather than valid color data, the method proceeds to step 308. At step 308, the pointer in the color field is used to fetch a plurality of color samples from a sample memory. This may include providing the pointer to a sample memory controller that facilitates interaction with the sample memory. At step 310, the plurality of color samples are blended to produce a pixel color for the pixel location. This may include averaging the values corresponding to each of the color samples. At step 312, the pixel color produced through blending is used to produce the portion of the display signal corresponding to the pixel location.

In other embodiments of the present invention, when the time to generate the display signal for a display frame arrives, the sample memory controller or another block may perform the blending operations on the sample sets in the sample memory to produce blended colors for all of the pixel locations that required more than one sample for description. The resultant colors produced through such blending could then be stored in the frame buffer preemptively such that when color values are to be read from the frame buffer for the generation of the display signal, all of the color values for all of the pixel locations are present in the frame buffer and not sample fetching is required. Such sample memory flushing may provide more efficiency than the method of FIG. 7.

It should be understood that the implementation of other variations and modifications of the invention in its various aspects will be apparent to those of ordinary skill in the art, and that the invention is not limited by the specific embodiments described. For example, methods of compressing the sample set for a pixel may be used which result in some loss of information, where the loss is understood and tolerated by the system. It is therefore contemplated to cover by the present invention, any and all modifications, variations, or equivalents that fall within the spirit and scope of the basic underlying principles disclosed and claimed herein.

What is claimed is:

1. A method for storing antialiasing pixel data, the method comprising:
   determining if a pixel sample set can be reduced to a compressed sample set, wherein the pixel sample set contains information describing a corresponding pixel, wherein the compressed sample set includes a color value, a Z value, and a first flag;
   when the pixel sample set can be reduced to the compressed sample set, storing the compressed sample set in a first memory at a first memory location, wherein the first flag of the compressed sample set indicates that the color value and the Z value for the corresponding pixel in the first memory are valid values; and
   when the pixel sample set cannot be reduced to the compressed sample set:
      determining a selected address in a second memory;
      storing the pixel sample set in the second memory at the selected address; and
      storing pointer information in the first memory location, wherein the pointer information includes a pointer and a second flag, wherein the pointer points to the selected address in the second memory, wherein the second flag indicates that pointer information is stored at the first memory location.

2. The method of claim 1 wherein:
   storing the compressed sample set in the first memory includes storing the first flag at a first bit position at the first memory location; and
   storing the pointer information includes storing the second flag at the first bit position.

3. The method of claim 1, wherein:
   the color value in the compressed sample set includes N bits of color information;
   the Z value in the compressed sample set includes N-1 bits of Z information; and
   the first flag is a 1-bit flag.

4. The method of claim 1, wherein the pointer information includes a front most Z value corresponding to the pixel sample set as stored in the second memory at the selected address.

5. The method of claim 1, wherein determining the selected memory address further comprises reading a counter.

6. The method of claim 1, wherein determining the selected memory address further comprises:
   determining if a stack is empty, wherein the stack stores released second memory addresses;
   when the stack is empty, reading the selected address from a counter; and
   when the stack is non-empty, popping the selected address from the stack.

7. An apparatus for display antialiasing comprising:
   a sample memory, wherein the sample memory stores a plurality of pixel entries, wherein each pixel entry of the plurality of pixel entries stores pixel data that includes a plurality of pixel samples;
   a frame buffer operably coupled to the sample memory, wherein the frame buffer stores a pixel array, wherein each element of the pixel array describes a pixel of the display, wherein:
      when pixel data corresponding to a pixel of the pixel array can be reduced to a compressed sample set, the compressed sample set is stored in an element of the pixel array corresponding to the pixel, wherein the compressed sample set includes a color value, a Z value, and a first flag, wherein the first flag indicates that the color value and the Z value for the pixel in the frame buffer are valid values; and
      when the pixel data corresponding to the pixel requires more than the compressed sample set to describe the pixel, pointer information is stored in the element of the pixel array corresponding to the pixel, wherein the pointer information includes a pointer and a second flag, wherein the pointer points to a pixel entry of the sample memory, wherein the second flag indicates that that pointer information is stored in the frame buffer, wherein the pixel data corresponding to the pixel is stored in the pixel entry; and
   a compressed sample block operably coupled to the frame buffer and the sample memory, wherein the compressed sample block determines whether pixel data sets can be summarized in compressed sample sets, and wherein the compressed sample block controls storage of pixel data in the frame buffer and the sample memory.

8. The apparatus of claim 7, wherein the pointer information includes a front most Z value corresponding to the pixel data as stored in the pixel entry of the sample memory.

9. The apparatus of claim 7 further comprising a counter operably coupled to the compressed sample block, wherein the counter indicates a next unused pixel entry of the sample memory, wherein when the compressed sample block requires an unused entry of the sample memory, the compressed sample block uses the next unused pixel entry.

10. The apparatus of claim 9 further comprising:
a stack operably coupled to the compressed sample block, wherein the stack stores released pixel entries,
wherein when the compressed sample block requires an unused entry of the sample memory and the stack contains a released pixel entry, the compressed sample block pops the released pixel entry from the stack for use as the unused entry, and when the stack does not contain a released pixel entry, the compressed sample block uses the next unused pixel entry indicated by the counter.

11. The apparatus of claim 7, wherein within each compressed sample set, the color value uses N-bits, the Z value uses (N−1) bits, and the first flag uses 1 bit.

12. A method for antialiasing, comprising:
receiving a pixel fragment corresponding to a stored pixel in a pixel array, wherein the pixel fragment is characterized by pixel fragment data, and wherein the stored pixel is characterized by stored pixel data;
merging the pixel fragment with the stored pixel to produce a resultant pixel, wherein the resultant pixel is characterized by resultant pixel data; and
storing the resultant pixel data, wherein storing includes:
when the resultant pixel data can be described with a compressed sample set, storing the compressed sample set in the pixel array, wherein the compressed sample set includes a color value, a Z value, and a first flag, wherein the first flag indicates that valid color and Z values are stored in the pixel array;
when the resultant pixel data cannot be described with a compressed sample set:
storing a sample set representing the resultant pixel data in a sample memory; and
storing pointer information in the pixel array, wherein the pointer information includes a pointer and a second flag, wherein the pointer points to the sample set in the sample memory, wherein the second flag indicates that pointer information is stored in the pixel array.

13. The method of claim 12, wherein the pointer information includes a front most Z value corresponding to the sample set representing the resultant pixel data as stored in the sample memory.

14. The method of claim 12, wherein storing the sample set further comprises:
determining if a stack contains the selected location;
when the stack contains the selected location, popping the selected location from the stack; and
when the stack does not contain the selected location, retrieving the selected location from a counter.

15. The method of claim 14 further comprises:
when the sample set is modified by a subsequent fragment such that the sample set can be reduced to a subsequent compressed sample set:
storing the subsequent compressed sample set in the pixel array in the first memory; and
pushing the selected location onto the stack.

16. The method of claim 12, wherein storing the sample set further comprises:
storing a plurality of samples, wherein each sample of the plurality of samples includes a color value and a Z value.

17. The method of claim 16, wherein storing the sample set further comprises storing the plurality of samples in a linked list structure, wherein the pointer stored in the pixel array points to a first member of the linked list structure.

18. An antialiasing video graphics system, comprising:
a frame buffer that stores a single-descriptor array, wherein each pixel of the video graphics system has a corresponding element in the single-descriptor array;
a sample memory that stores a multi-sample array, wherein each element of the multi-sample array stores a predetermined number of samples;
a next element counter, wherein the next element counter stores a next free element location of the multi-sample array;
a stack, wherein the stack stores released locations corresponding to released multi-sample array entries;
a controller operably coupled to the frame buffer, the sample memory, the next element counter and the stack, wherein the controller performs the steps of:
receiving a pixel fragment that corresponds to a pixel of the video graphics system;
merging the pixel fragment with stored pixel data corresponding to the pixel to produce a resultant pixel, wherein the resultant pixel is characterized by resultant pixel data; and
storing the resultant pixel data, wherein storing includes:
when the resultant pixel data can be described with a single-descriptor data set, storing the single-descriptor data set in the frame buffer in an element of the single-descriptor array corresponding to the pixel, wherein the single-descriptor data set includes a color value, a Z value, and a first flag, wherein the first flag indicates that the color and Z values are valid values; and
when the resultant pixel data requires a multi-sample data set:
determining if a stack contains a released entry;
when the stack contains the released entry, popping the released entry from the stack for use as a sample memory element address;
when the stack does not contain the released entry, retrieving the sample memory element address from the next element counter;
storing the multi-sample data set at the sample memory element address in the sample memory, wherein the multi-sample data set includes a plurality of samples, wherein each sample of the plurality of samples includes a color value and a Z value; and
storing pointer information in the frame buffer in the element of the single-descriptor array corresponding to the pixel, wherein the pointer information includes a pointer and a second flag, wherein the pointer points to the multi-sample data set in the sample memory, wherein the second flag indicates that pointer information is stored in the element of the single-descriptor array.

19. The antialiasing video graphics system of claim 18, wherein the pointer information includes a front most Z value that indicates a front most Z value for the plurality of samples included in the multi-sample data set.

20. A method for generating a display signal in an antialiased video graphics system, comprising:
for each pixel location of a plurality of pixel locations corresponding to a display frame:
reading an entry from a frame buffer corresponding to the pixel location of a display;
when a flag included in the entry indicates that the entry stores valid color data for the pixel location, using the valid color data included in the entry to generate a portion of the display signal corresponding to the pixel location;

when the flag included in the entry indicates that the entry does not store valid color data for the pixel location:

fetching a plurality of color samples from a sample memory for the pixel location based on a pointer included in the entry;

blending the color samples to produce a pixel color for the pixel location; and using the pixel color produced to generate the portion of the display signal corresponding to the pixel location.

21. The method of claim 20, wherein the plurality of color samples stored in the sample memory are stored in a linked list format.

22. The method of claim 20, wherein blending the color samples further comprises averaging the color samples to produce the pixel color.

* * * * *